(12) United States Patent
Tewes et al.

(10) Patent No.: US 12,199,930 B1
(45) Date of Patent: Jan. 14, 2025

(54) PURGING PARTICIPANT MESSAGING GROUPS

(71) Applicant: WhatsApp LLC, Menlo Park, CA (US)

(72) Inventors: Isabel Tewes, Los Angeles, CA (US); Sarah Hassan, San Jose, CA (US); Bruno Soares, Medfield, MA (US); Steven Zimmerman, Hoboken, NJ (US)

(73) Assignee: WhatsApp LLC, Menlo Park, CA (US)

( * ) Notice: Subject to any disclaimer, the term of this patent is extended or adjusted under 35 U.S.C. 154(b) by 0 days.

(21) Appl. No.: 18/082,438

(22) Filed: Dec. 15, 2022

(51) Int. Cl.
*G06F 15/16* (2006.01)
*H04L 51/18* (2022.01)
*H04L 51/52* (2022.01)

(52) U.S. Cl.
CPC .............. *H04L 51/18* (2013.01); *H04L 51/52* (2022.05)

(58) Field of Classification Search
CPC ..... H04L 51/18; H04L 51/52; H04L 67/5682; G06F 3/0652
USPC ................. 709/206, 204, 223, 226
See application file for complete search history.

(56) References Cited

U.S. PATENT DOCUMENTS

| | | | |
|---|---|---|---|
| 7,644,144 B1* | 1/2010 | Horvitz ................. | G06Q 10/10 709/204 |
| 2003/0236823 A1* | 12/2003 | Patzer ..................... | H04L 67/04 709/203 |
| 2005/0188036 A1* | 8/2005 | Yasuda ................ | G06Q 10/107 709/206 |
| 2011/0182426 A1* | 7/2011 | Roosta .................. | H04L 9/0833 380/255 |
| 2012/0023072 A1* | 1/2012 | Garg ................... | H04L 12/1818 709/204 |
| 2013/0018751 A1* | 1/2013 | Winslade ............... | G06Q 30/02 705/26.2 |
| 2013/0179804 A1* | 7/2013 | Kang .................. | G06F 3/04817 715/756 |
| 2014/0101453 A1* | 4/2014 | Senthurpandi .......... | G06F 21/32 713/172 |
| 2020/0259779 A1* | 8/2020 | Liu ......................... | H04L 51/10 |

\* cited by examiner

*Primary Examiner* — Kaylee J Huang
(74) *Attorney, Agent, or Firm* — McDermott Will & Emery LLP

(57) ABSTRACT

Methods, systems, and storage media for managing and removing participant groups on a social media platform. In an exemplary method, the disclosure comprises receiving a request to generate a participant group wherein the participant group comprises a plurality of members that can access the participant group. The method comprises receiving an expiration date to terminate the participant group. The method comprises generating a deletion request for the participant group, based on a lapse of the expiration date. The method comprises transmitting the deletion request to the participant group; and purging the participant group.

10 Claims, 6 Drawing Sheets

PURGING PARTICIPANT MESSAGING
GROUPS

TECHNICAL FIELD

The present disclosure generally relates to defining similarities in social media posts, and more particularly to mapping similarities of the social media posts to a hyperspace platform.

BACKGROUND

As more of our communication happens online, there are more and more groups started with temporary utility. Today, those continue to exist past the point they are useful, and remain on everyone's phones and servers until each person leaves. The additional server side capabilities required to store and service these groups can be taxing on the system. On the client side, people can be a part of dozens of groups. Correspondence related to these groups can be very noisy (90% of muted chats are groups), many of them inactive (30% of groups set up become inactive after a week). For privacy reasons and efficiency of operating the platform hosting groups, management and purging of inactive groups would be safer.

BRIEF SUMMARY

The subject disclosure provides for defining similarities of various forms of content including: text, video, and photo. The disclosure addresses the problem of establishing similarities between the post content associated with a query. The solution addresses the problem of predicting future engagement by a user on the platform by correlating the content of the posts. The similarities determined can be used to predict future engagement and generate suggested content that can be provided to the user of the platform.

One aspect of the present disclosure relates to a method for managing groups on a social media platform. In an exemplary method, the disclosure comprises receiving a request to generate a participant group wherein the participant group comprises a plurality of members that can access the participant group. The method comprises receiving an expiration date to terminate the participant group. The method comprises generating a deletion request for the participant group, based on a lapse of the expiration date. The method comprises transmitting the deletion request to the participant group and purging the participant group.

Another aspect of the present disclosure relates to a system configured for managing groups on a social media platform. The system may include one or more hardware processors configured by machine-readable instructions. The processor(s) may be configured to receive a request to generate a participant group. The participant group comprises a plurality of members that can access the participant group. When the processors generate the participant group, they can also generate metadata associated with participant group. The processor can receive an expiration date to terminate the participant group. The processor can generate a deletion request for the participant group, based on a lapse of the expiration date. The deletion request comprises instructions configured to remove the participant group from each user device associated with each of the plurality of members in the participant group. The processor can transmit the deletion request to the participant group. The processor can also purge the participant group.

Yet another aspect of the present disclosure relates to a non-transient computer-readable storage medium having instructions embodied thereon, the instructions being executable by one or more processors to perform a method for managing groups on a social media platform. The method comprises receiving a request to generate a participant group. The participant group comprises a plurality of members that can access the participant group. The processor can also execute instructions to generate metadata associated with the participant group. The method can include receiving an expiration date to terminate the participant group. The method can include generating a deletion request for the participant group, based on a lapse of the expiration date. The deletion request comprises instructions configured to remove the participant group from each user device associated with each associated of the plurality of members in the participant group. The method can include transmitting the deletion request to the participant group. The method can also include purging the participant group.

BRIEF DESCRIPTION OF THE SEVERAL
VIEWS OF THE DRAWINGS

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

When accessing a social media platform, a user may find themselves a member of multiple groups. Some of the groups may be inactive, which can cause unnecessary clutter with messaging and storage requirements to maintain service for the group. Here, purging/disappearing groups can allow a group manager to set an expiration date at which point the entire conversation is deleted from all of the participants' phones as well as servers. When a group manager or administrator sets up a group, they have the option to set the entire group to disappear with a toggle on a user interface. The process can take the group administrator to a calendar to select an expiration date. The group chat associated with the group can continue as normal until a day before the expiration date, when all of the members of the group get a reminder so they can save any photos to their camera roll if they haven't, or they can add any numbers to their contacts. The administrator can also implement a deletion delay to push back the group expiration date. In on aspect, the administrator can define the delay to be 24 hours from the original expiration date. Upon the expiration date, the entire digital footprint of the group can be deleted.

Figure 1:
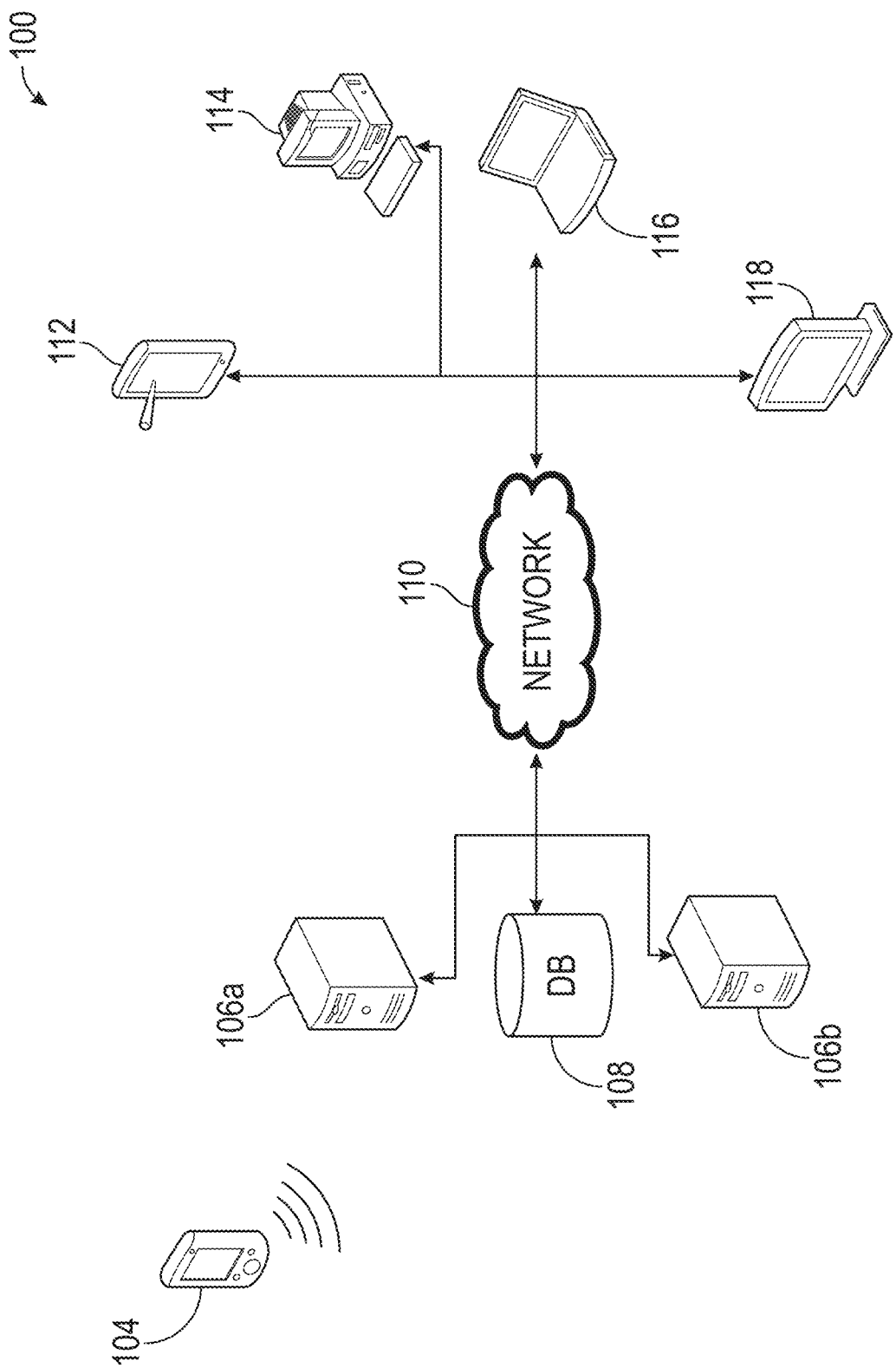
FIG. 1 depicts an exemplary environment of the system.

FIG. 1 is a block diagram illustrating an overview of an environment 100 in which some implementations of the disclosed technology can operate. The environment 100 can include one or more client computing devices, mobile device 104, tablet 112, personal computer 114, laptop 116, desktop 118, and/or the like. Client devices may communicate wirelessly via the network 110. The client computing devices can operate in a networked environment using logical connections through network 110 to one or more remote computers, such as server computing devices. The server computing devices 106a-106b may be configured to show (e.g., make encrypted content visible) content to one or more of the client computing devices for those client computing devices that presented a correct public key. As an example, the server computing devices 106a-106b can include a database (e.g., database 108) that tracks which users of the client computing devices have granted access to their encrypted content (e.g., encrypted by corresponding privately held private keys) to other client users.

In some implementations, the environment 100 may include a server such as an edge server which receives client requests and coordinates fulfillment of those requests through other servers. The server may include the server computing devices 106a-106b, which may logically form a single server. Alternatively, the server computing devices 106a-106b may each be a distributed computing environment encompassing multiple computing devices located at the same or at geographically disparate physical locations. The client computing devices and server computing devices 106a-106b can each act as a server or client to other server/client device(s). The server computing devices 106a-106b can connect to a database 108 or can comprise its own memory. Each server computing devices 106a-106b can correspond to a group of servers, and each of these servers can share a database 108 or can have their own database 108. The database 108 may logically form a single unit or may be part of a distributed computing environment encompassing multiple computing devices that are located within their corresponding server, located at the same, or located at geographically disparate physical locations. The database 108 can store data indicative of keys or access granted by a given user to other users of the given user's encrypted content and/or shared social media content that can be subscribed to by other users.

The network 110 can be a local area network (LAN), a wide area network (WAN), a mesh network, a hybrid network, or other wired or wireless networks. The network 110 may be the Internet or some other public or private network. Client computing devices can be connected to network 110 through a network interface, such as by wired or wireless communication. The connections can be any kind of local, wide area, wired, or wireless network, including the network 110 or a separate public or private network. In some implementations, the server computing devices 106a-106b can be used as part of a social network such as implemented via the network 110. The social network can host content and protect access to the content, such as via the database 108, although the server computing devices 106a-106b of the social network do not have access to private keys and can be remote/separate from the application(s) that perform key generation and content encryption. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea. The social networking system can enable a user to enter and display information related to the users' interests, age/date of birth, location (e.g., longitude/latitude, country, region, city, etc.), education information, life stage, relationship status, name, a model of devices typically used, languages identified as ones the user is familiar with, occupation, contact information, or other demographic or biographical information in the users' profile. Any such information can be represented, in various implementations, by a node or edge between nodes in the social graph.

The social networking system can enable a user to upload or create pictures, videos, documents, songs, or other content items, and can enable a user to create and schedule events. Content items can be represented, in various implementations, by a node or edge between nodes in the social graph. The social networking system can enable a user to perform uploads or create content items, interact with content items or other users, express an interest or opinion, or perform other actions. The social networking system can provide various means to interact with non-user objects within the social networking system. Actions can be represented, in various implementations, by a node or edge between nodes in the social graph. For example, a user can form or join groups, or become a fan of a page or entity within the social networking system. In addition, the user can create, download, view, upload, link to, tag, edit, or play a social networking system object. The user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, the user can use location detection functionality (such as a GPS receiver on a mobile device) to "check in" to a particular location, and an edge can connect the user's node with the location's node in the social graph.

The social networking system can provide a variety of communication channels to users. For example, the social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post, or other content item created or uploaded by the user or another user. And it can allow users to interact (via their avatar or true-to-life representation) with objects or other avatars in a virtual environment (e.g., in an artificial reality working environment), etc. In some embodiments, a user can post a status message to the user's profile indicating a current event, state of mind, thought, feeling, activity, or any other present-time relevant communication. The social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment where users can communicate and interact via avatars or other digital representations of themselves. Further, the first user can comment on the profile page of a second user or can comment on objects associated with the second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse, or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users, and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figures 2A, 2B, 2C:
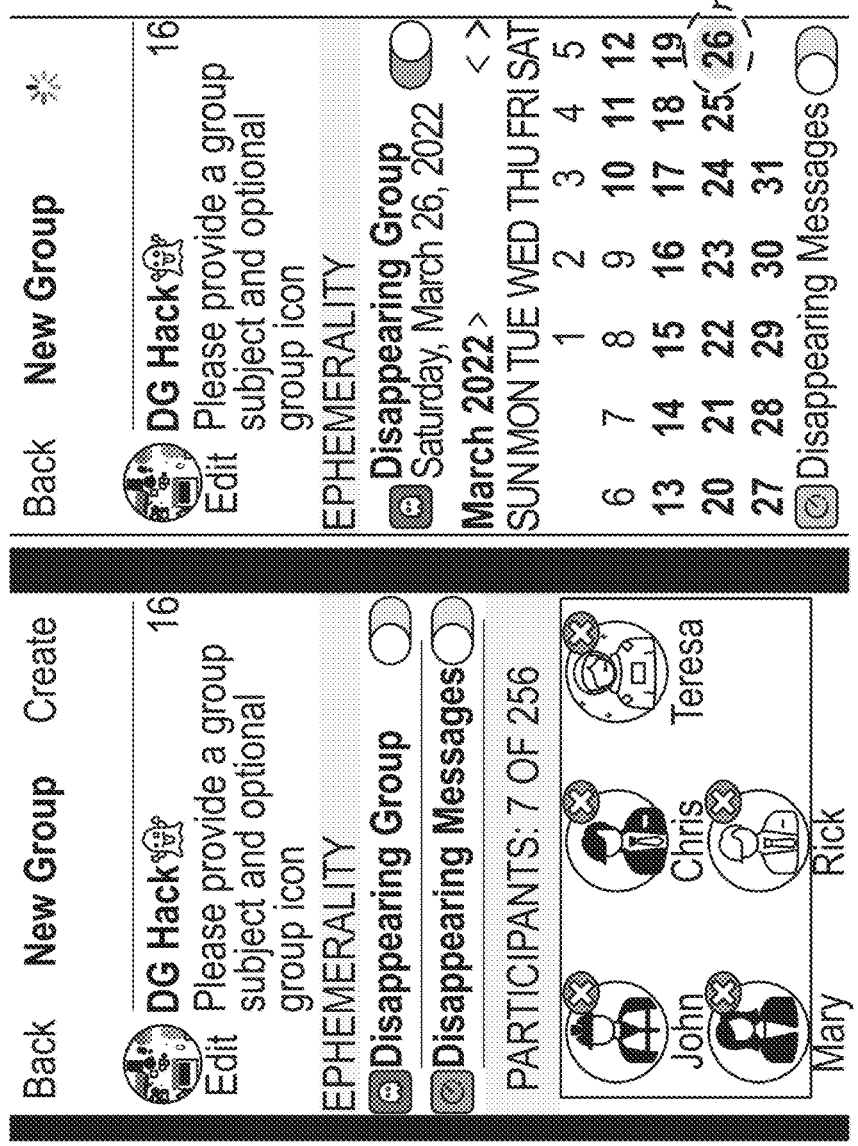
FIGS. 2A-2C depict screen shots of a user display interacting on the client side of the system.

When a user attempts to define the group, the system can allow the user to select a group of individuals, as depicted in FIG. 2A. The individuals can be selected from a contact list or manually entered. Further, the system can define a termination date wherein the group will expire, as depicted FIG. 2B. The attributes of the group can be depicted on a display, as depicted in FIG. 2C. These client side attributes accessible via the social media platform operating on the user device can be coordinated with server side capabilities. The server side capabilities can ensure that the created group is deleted at the previous selected data.

Figure 3:
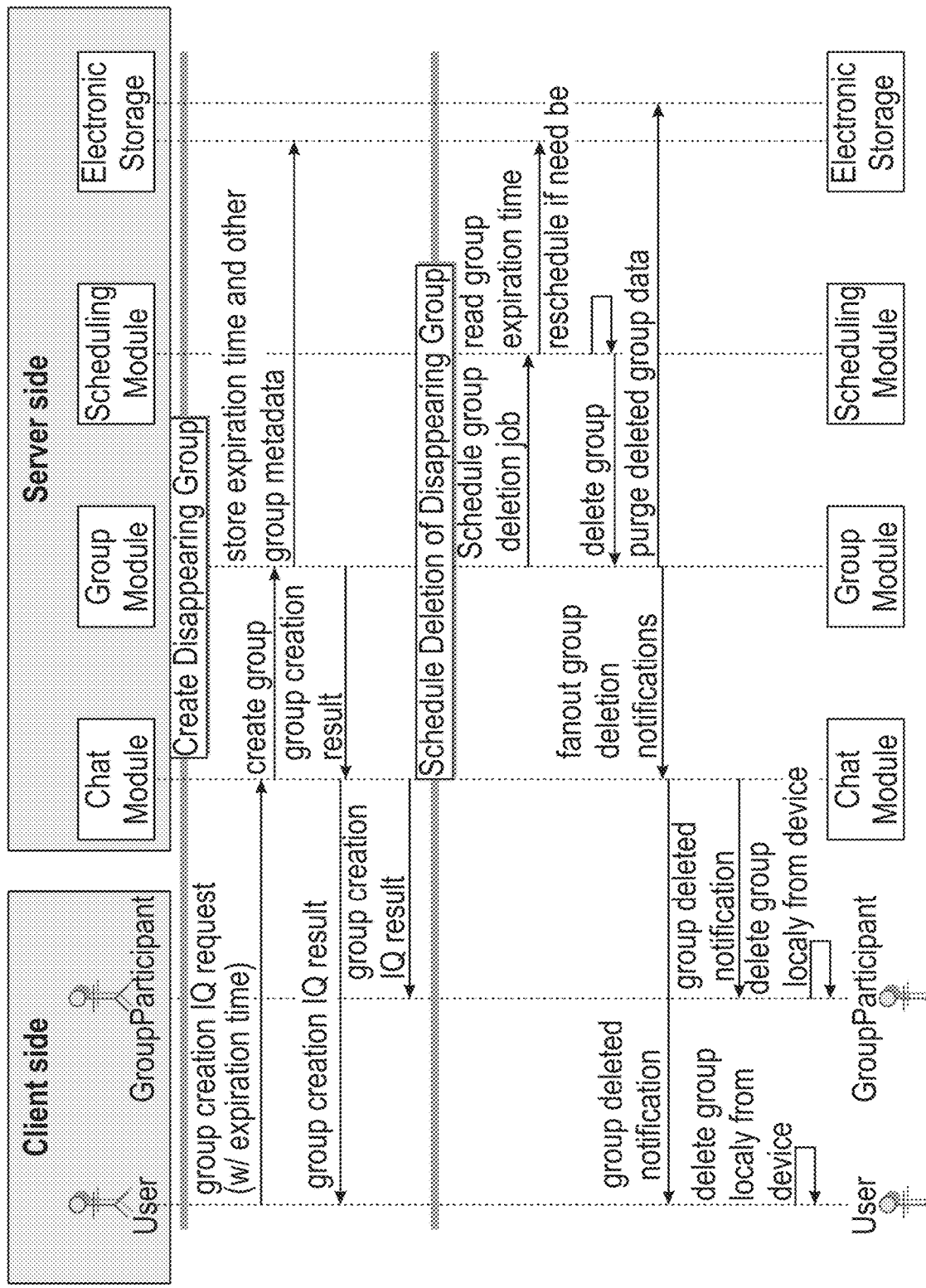
FIG. 3 illustrates a process flow for the client side and server side of the system.

As depicted in FIG. 3, a group administrator can create a group in the platform via their user device. When the group administrator creates the group, an expiration time can be set for the group. The server can then create a group and store on the server for a duration until the termination date on components of the server. The server can then send an acknowledgement of the groups creation (e.g., an informational query IQ result) to the group participants. In a further aspect, the client side application can grant permissions for instructions received from the server side to access the group via the social media platform operating on the user device.

Once the termination date of the group lapses, the server can initiate a protocol to delete the group. In one aspect, the server can access storage to determine hours, minutes, and/or seconds to initiate terminating the group. In a further aspect, the server can initiate an action to delay deletion of the group. In a further aspect, the server can generate a purge table. The purge table can serve as a marker that the deletion of the group will occur. Once any delay requests have been removed, the server can delete the group. When the group is deleted, any data associated with the group can be deleted from the server. For example, the deletion of the group can include deletion of the group metadata and participant metadata. For example, the group metadata can be: group identifier (e.g., an ID number), the name of the group, group description, or group administrator, whereas participant metadata may include individual participants' membership in the group. The server can also send notifications to the various group participants and the group administrator. The server can also send an instruction to have the groups deleted on the user devices associated with each group participant in the platform. In a further aspect, the server will send additional scans to the client devices to test and ensure that the groups have been removed from the client devices. If the group is still present on the device on the client side, the user device may send a request for additional data related to the deleted group. Upon receipt of this request, the server can send a follow-up notification to remove the group from the user device. The additional scans may be necessary in situations where group participants are not immediately using a client device. Once all metadata associated with the group has been deleted, the group can be marked as deleted in the purge table. The data associated with the deletion can be stored.

Figure 4:
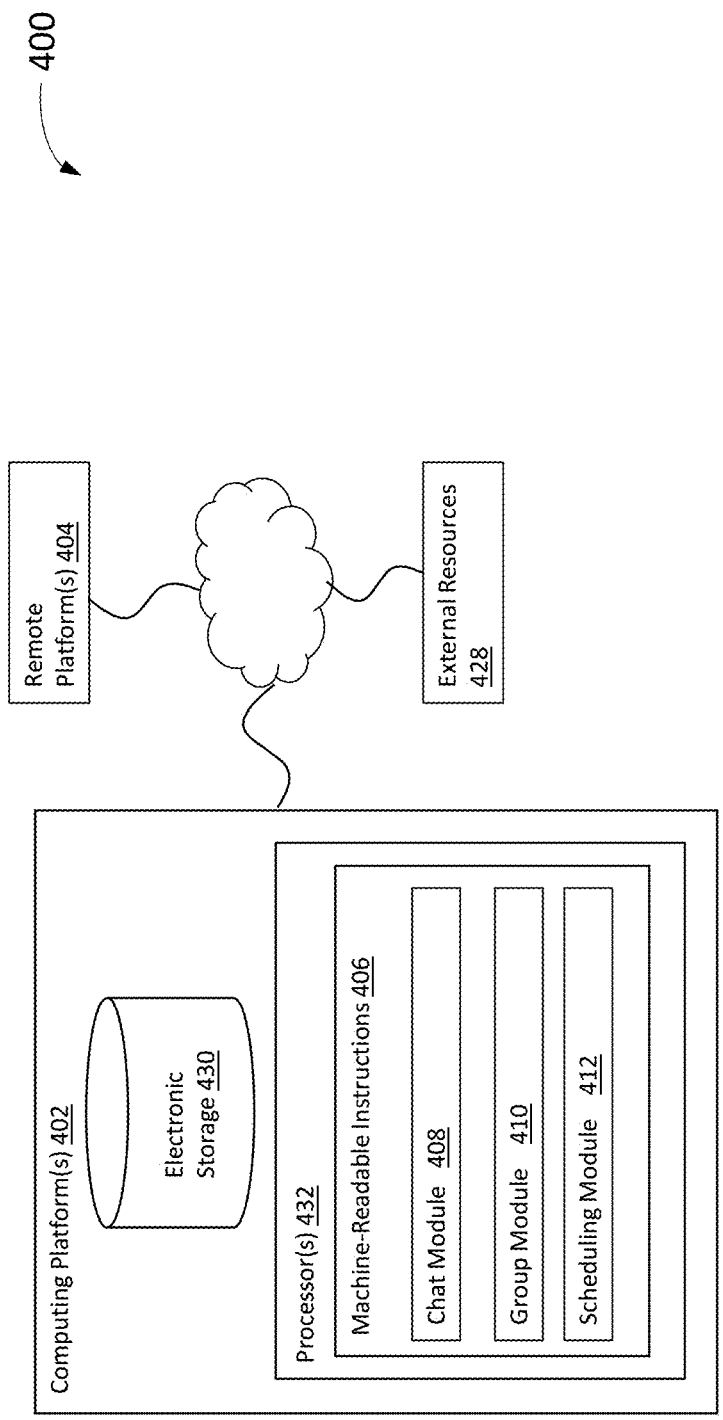
FIG. 4 is a block diagram illustrating an example computer system (e.g., representing both client and server) with which aspects of the subject technology can be implemented.

FIG. 4 illustrates a system 400 configured for providing ephemeral messages, according to certain aspects of the disclosure. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of request chat module 408, group module 410, scheduling module 412, and/or other instruction modules.

The chat module 408 can be configured to serve as the interface between the client side and server side. Further, the chat module 408 can serve as the entry point to the server side from the client side. In one aspect, the chat module can authenticate the client and transfer data and/or requests from the client to another portion of the server for processing. The group module 410 manages processing with the group on the server side. The group module 410 service requests data processing related to creation, manipulation, and deletion of the group. The scheduling module 412 manages the timing and execution of tasks for the group.

In some implementations, computing platform(s) 402, remote platform(s) 404, and/or external resources 428 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 428 may be operatively linked via some other communication media.

A given remote platform 404 may include one or more processors configured to execute computer program modules. The computer program modules may be configured to enable an expert or user associated with the given remote platform 404 to interface with system 400 and/or external resources 428, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 428 may include sources of information outside of system 400, external entities participating with system 400, and/or other resources. In some implementations, some or all of the functionality attributed herein to external resources 428 may be provided by resources included in system 400.

Computing platform(s) 402 may include electronic storage 430, one or more processors 432, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 430 may comprise non-transitory storage media that electronically stores information. The electronic storage media of electronic storage 430 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 430 may include one or more virtual storage resources (e.g., cloud storage, a virtual private network, and/or other virtual storage resources). Electronic storage 430 may store software algorithms, information determined by processor(s) 432, information received from computing platform(s) 402, information received from remote platform(s) 404, and/or other information that enables computing platform(s) 402 to function as described herein.

Processor(s) 432 may be configured to provide information processing capabilities in computing platform(s) 402. As such, processor(s) 432 may include one or more of a digital processor, an analog processor, a digital circuit designed to process information, an analog circuit designed to process information, a state machine, and/or other mechanisms for electronically processing information. Although processor(s) 432 is shown in FIG. 3 as a single entity, this is for illustrative purposes only. In some implementations, processor(s) 432 may include a plurality of processing units. These processing units may be physically located within the same device, or processor(s) 432 may represent processing functionality of a plurality of devices operating in coordination. Processor(s) 432 may be configured to execute modules 408, 410, 412, 414, and/or 416, and/or other modules. Processor(s) 432 may be configured to execute modules 408, 410, 412, 414, and/or 416, and/or other modules by software; hardware; firmware; some combination of software, hardware, and/or firmware; and/or other mechanisms for configuring processing capabilities on processor(s) 432. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, and/or 416 are illustrated in FIG. 3 as being implemented within a single processing unit, in implementations in which processor(s) 432 includes multiple processing units, one or more of modules 408, 410, 412, 414, and/or 416 may be implemented remotely from the other modules. The description of the functionality provided by the different modules 408, 410, 412, 414, and/or 416 described below is for illustrative purposes, and is not intended to be limiting, as any of modules 408, 410, 412, 414, and/or 416 may provide more or less functionality than is described. For example, one or more of modules 408, 410, 412, 414, and/or 416 may be eliminated, and some or all of its functionality may be provided by other ones of modules 408, 410, 412, 414, and/or 416. As another example, processor(s) 432 may be configured to execute one or more additional modules that may perform some or all of the functionality attributed below to one of modules 408, 410, 412, 414, and/or 416.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
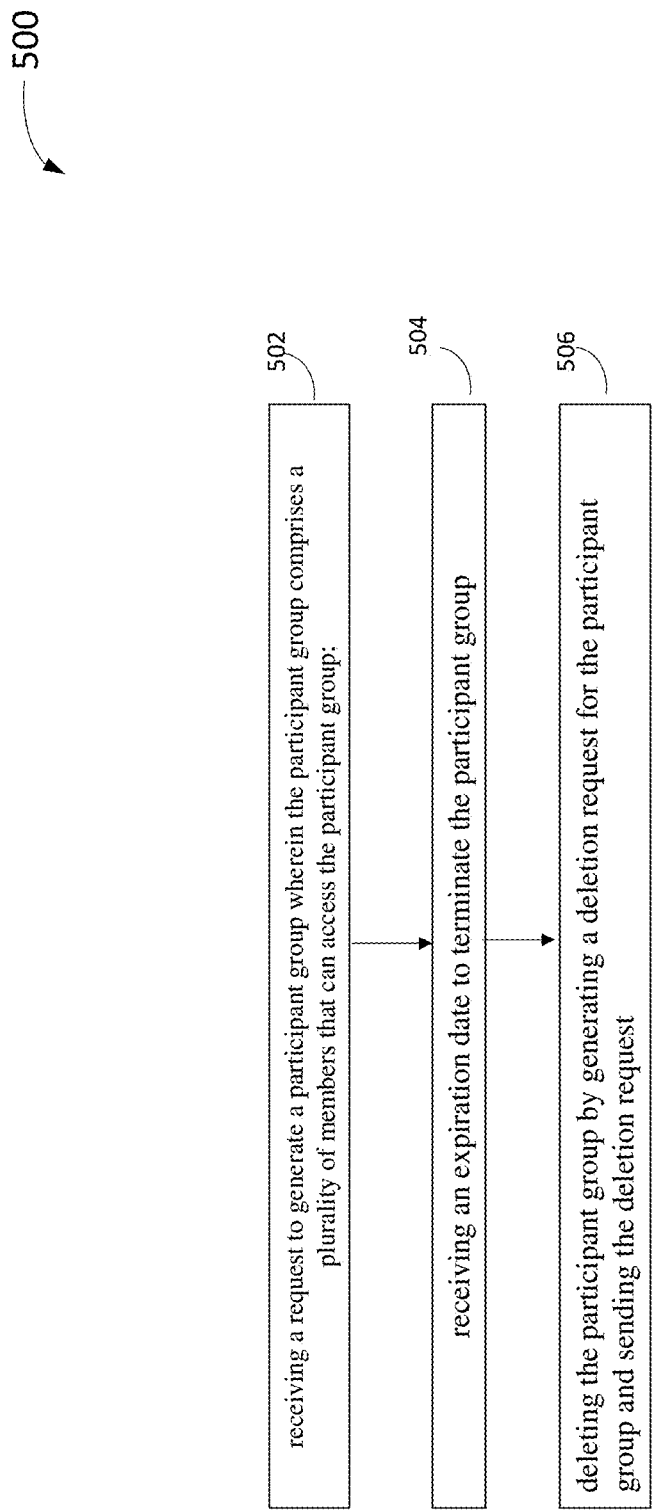
FIG. 5 illustrates an example flow diagram for managing and disappearing groups on a social media platform.

FIG. 5 illustrates an example flow diagram (e.g., process 500) for managing a participant group on a social media platform and subsequently purging the participant group on the server and client side of the social media platform. For explanatory purposes, the example process 500 is described herein with reference to FIGS. 1-4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-4.

At step 502, the process 500 can include receiving a request to generate a participant group wherein the participant group comprises a plurality of members that can access the participant group. In one aspect, generating a participant group can include generating metadata to be associated with the participant group. The metadata can include a group identifier (e.g., group Identification number); members of group; group creator, creation time, subject; or description. At step 504, the process 500 can include receiving an expiration date to terminate the participant group. At step 506, the process 500 can include generating a deletion request for the participant group, based on a lapse of the expiration date. In a further aspect, the deletion request can be configured to remove the participant group from each user device associated with each of the plurality of members in the participant group.

At step 508, the process 500 can include transmitting the deletion request to the participant group. In a further aspect, the process can generate a pre-deletion notice and transmit the pre-deletion notice to the members of the group. In the event that a response is not received by an associated deadline, the system can store components of the chat including: text, images, and video associated with the group chat. At step 510, the process can include purging the participant group. In a further aspect, purging the participant group can include generating a purge table. The purge table can serve as a checklist for a verifiable group deletion. The purge list can comprise a deletion time stamp associated with the participant group. In a further aspect, purging the participant group can include deleting a relationship mapping associated between each member of a participant group and the participant. In another aspect, the purging of the participant group can include generating a purge table crawler. The purge table crawler can be configured to: search the purge table for the deletion time stamp and determine that the deletion time stamp has been removed. The process 500 can also send a supplemental deletion request to the participant group to confirm deletion of the participant group on each user device. The supplemental deletion request can be repeated multiple times to ensure that all record of the participant group has been deleted from each customer's devices. The supplemental deletion request can be utilized to reach user devices that may have been offline from the social media platform at the time of the initial deletion request being sent to user devices associated with the group member.

Figure 6:
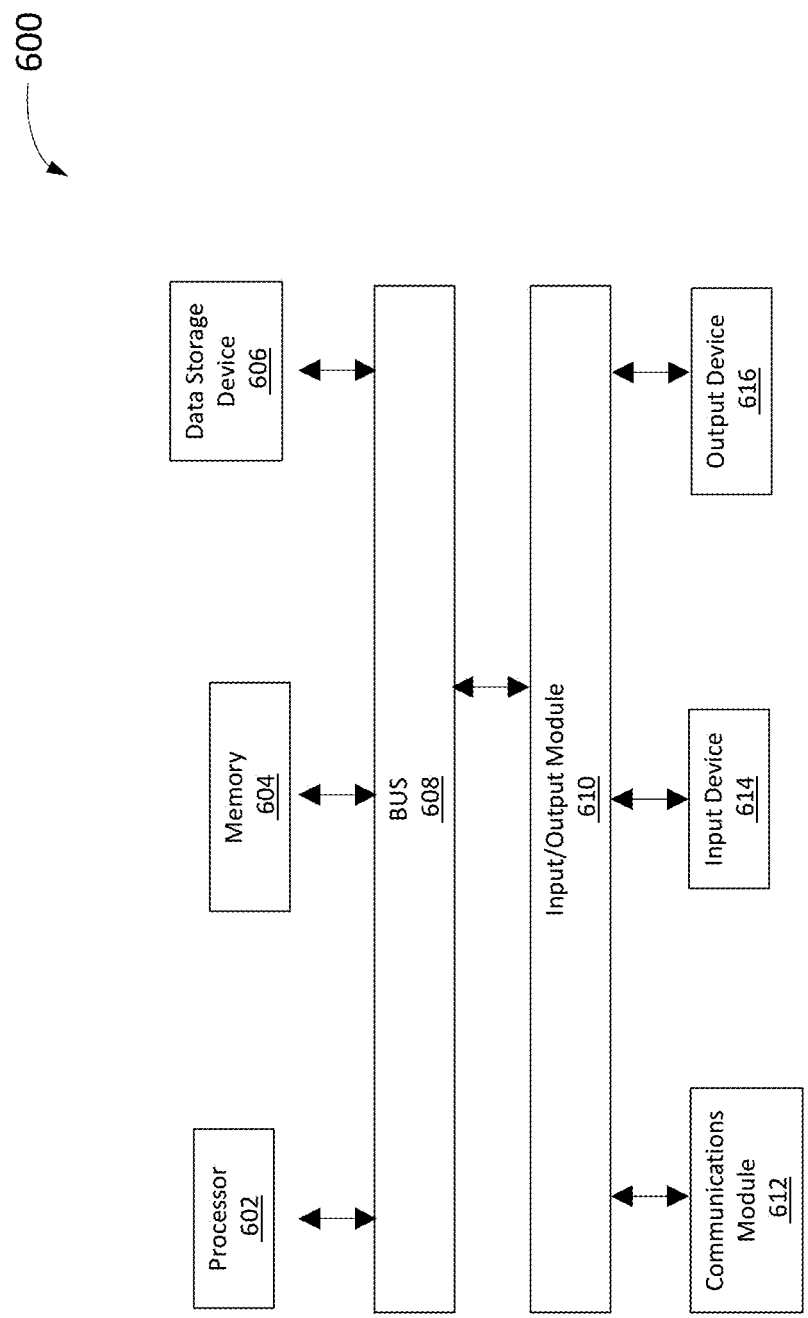
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototypebased languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B. and C.

To the extent that the terms "include." "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for managing a participant group, the method comprising:
   receiving a request to generate the participant group comprising generating group metadata and participant metadata;
   receiving an expiration date to terminate the participant group;
   generating an initial deletion request for the participant group, based on a lapse of the expiration date;
   transmitting the initial deletion request to the participant group;
   purging the participant group, wherein purging the participant group comprises generating a purge table, wherein the purge table comprises a deletion time stamp associated with the participant group;
   generating a purge table crawler, wherein the purge table crawler is configured to: search the purge table for the deletion time stamp and determine the deletion time stamp has been removed;
   determining that the participant group is present on a client side of a user device associated with a participant of the participant group; and
   in response to determining that the participant group is present on the client side of the user device, transmitting a supplemental deletion request for the participant group to confirm a purge of the group metadata and the participant metadata, wherein the supplemental deletion request is configured to delete the participant group from each user device associated with each participant of the participant group.

2. The method of claim 1, wherein purging further comprises deleting a relationship mapping associated between the participant group and each member of the participant group.

3. The method of claim 1, wherein the group metadata comprises: members of the participant group; group creator, creation time, subject; or description.

4. The method of claim 1, further comprising delaying a deletion of the participant group based on receiving a delay request.

5. A system configured for managing a participant group, the system comprising:
   one or more hardware processors configured by machine-readable instructions to: receive
     a request to generate the participant group wherein the participant group comprises a plurality of members associated with the participant group wherein receiving the request to generate the participant group comprises generating group metadata and participant metadata associated with the participant group;
     receive an expiration date to terminate the participant group;
     generate an initial deletion request for the participant group, based on a lapse of the expiration date, wherein the initial deletion request comprises instructions configured to remove the participant group from each user device associated with each of the plurality of members in the participant group;
     transmit the initial deletion request to the participant group;
     purge the participant group, wherein purging the participant group comprises generating a purge table, wherein the purge table comprises a deletion time stamp associated with the participant group;

generate a purge table crawler, wherein the purge table crawler is configured to: search the purge table for the deletion time stamp and determine the deletion time stamp has been removed;

determine that the participant group is present on a client side of a user device associated with a participant of the participant group; and in response to determining that the participant group is present on the client side of the user device, transmit a supplemental deletion request for the participant group to confirm a purge of the group metadata and the participant metadata, wherein the supplemental deletion request is configured to delete the participant group from each user device associated with each participant of the participant group.

6. The system of claim 5, wherein the group metadata comprises: members of the participant group; group creator, creation time, subject; or description.

7. The system of claim 5, wherein the instructions being further configured to delay a deletion of the participant group based on receiving a delay request.

8. The system of claim 5, wherein the instructions being configured to purge the participant group further comprises deleting a relationship mapping associated between the participant group and each member of the participant group.

9. A non-transitory computer-readable storage medium having instructions embodied thereon, the instructions being executable by one or more processors to perform a method managing a participant group, the method comprising:

receiving a request to generate the participant group comprising generating group metadata and participant metadata;

receiving an expiration date to terminate the participant group;

generating an initial deletion request for the participant group, based on a lapse of the expiration date;

transmitting the initial deletion request to the participant group;

purging the participant group, wherein purging the participant group comprises generating a purge table, wherein the purge table comprises a deletion time stamp associated with the participant group;

generating a purge table crawler, wherein the purge table crawler is configured to: search the purge table for the deletion time stamp and determine the deletion time stamp has been removed;

determining that the participant group is present on a client side of a user device associated with a participant of the participant group; and in response to determining that the participant group is present on the client side of the user device, transmitting a supplemental deletion request for the participant group to confirm a purge of the group metadata and the participant metadata, wherein the supplemental deletion request is configured to delete the participant group from each user device associated with each participant of the participant group.

10. The non-transitory computer-readable storage medium of claim 9, further comprising delaying a deletion of the participant group based on receiving a delay request.

* * * * *